(12) United States Patent
Orent

(10) Patent No.: US 7,681,817 B2
(45) Date of Patent: Mar. 23, 2010

(54) FOOD PROCESSOR

(75) Inventor: Jill Kreutzer Orent, Westport, CT (US)

(73) Assignee: Conair Corporation, Stamford, CT (US)

( * ) Notice: Subject to any disclaimer, the term of this patent is extended or adjusted under 35 U.S.C. 154(b) by 71 days.

(21) Appl. No.: 11/959,623

(22) Filed: Dec. 19, 2007

(65) Prior Publication Data

US 2008/0156913 A1     Jul. 3, 2008

Related U.S. Application Data

(60) Provisional application No. 60/875,680, filed on Dec. 19, 2006.

(51) Int. Cl.
*A47J 43/046* (2006.01)
(52) U.S. Cl. .................. 241/92; 241/282.1
(58) Field of Classification Search ............ 241/92, 241/282.1, 282.2
See application file for complete search history.

(56) References Cited

U.S. PATENT DOCUMENTS

| 4,194,697 | A | * | 3/1980 | Lembeck | 241/92 |
| 4,199,112 | A | * | 4/1980 | McLean | 241/92 |
| 5,395,060 | A | * | 3/1995 | Hackel et al. | 241/92 |
| 7,229,036 | B2 | * | 6/2007 | Carnevale et al. | 241/36 |

* cited by examiner

*Primary Examiner*—Mark Rosenbaum
(74) *Attorney, Agent, or Firm*—Lawrence Cruz

(57) ABSTRACT

A food processor (100) includes one or more of a removable feed tubes (155), a cover or lid (156) for a feed tube opening (154), a double sided grating disc (190), a bowl or receptacle (110) having a pour spout and a complimentary hinged spout lid (140s) on the bowl cover (140), a bowl mounted drive shaft (115), an extensible shaft for mounting various blades or discs at various heights, and an adjustable thickness slicing disc (180).

9 Claims, 9 Drawing Sheets

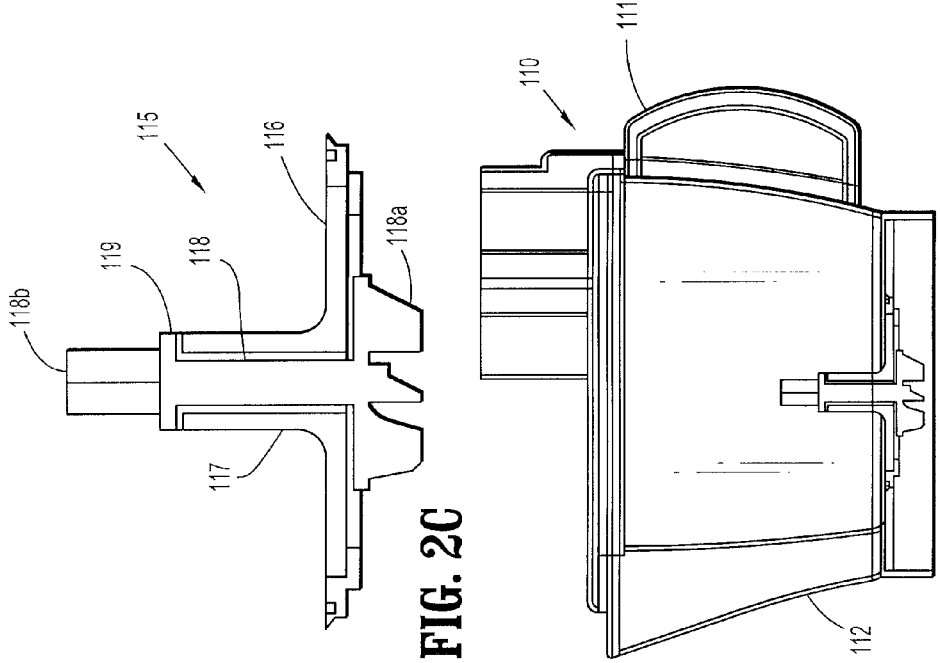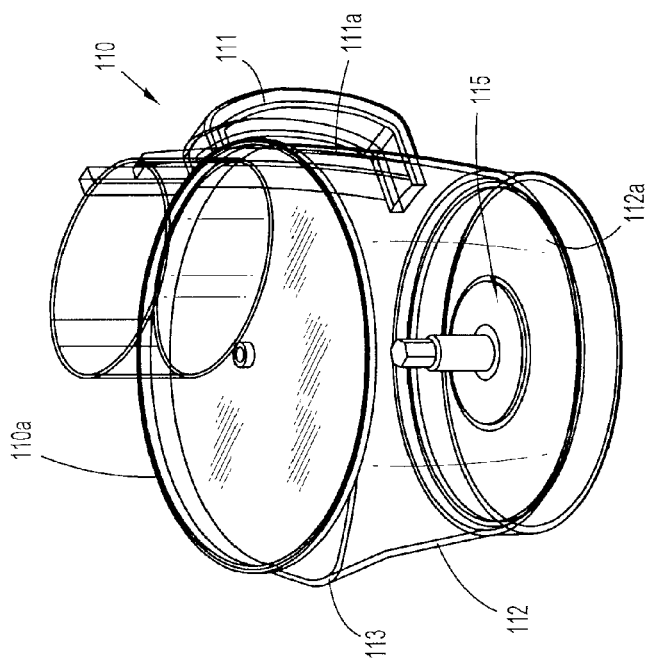

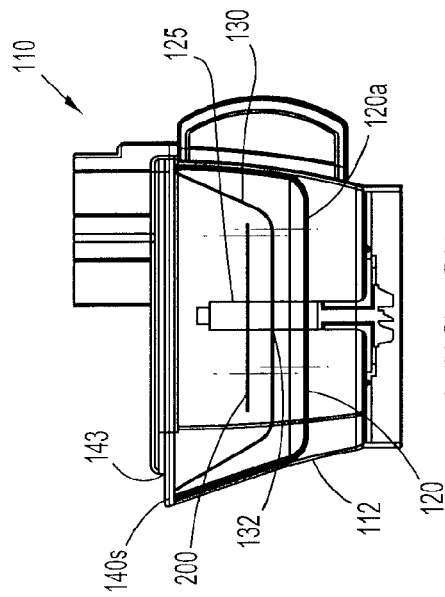
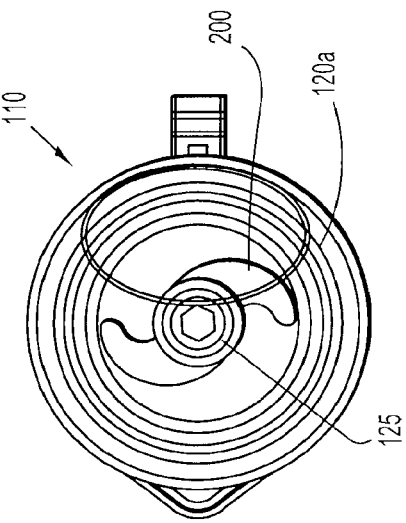
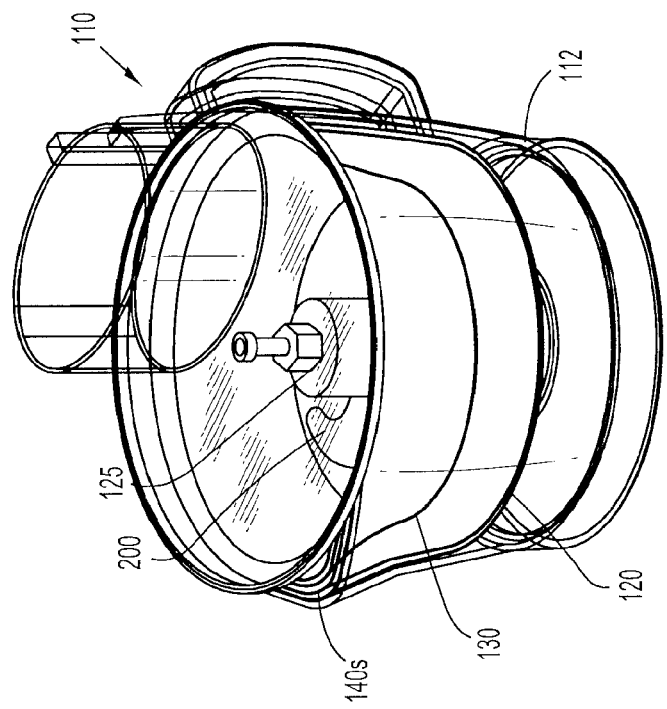
FIG. 3B
FIG. 3C
FIG. 3A

FOOD PROCESSOR

CROSS REFERENCE TO RELATED APPLICATIONS

This application claims the benefit of and priority to U.S. Provisional Patent Application Ser. No. 60/875,680, filed Dec. 19, 2006, the entire content of which is incorporated by reference herein.

BACKGROUND

1. Field of the Disclosure

The present invention relates to food appliances and, more particularly, to electric food processors.

2. Description of Related Art

Electric food processors exist in various sizes and forms. A food processor may be used to prepare food by mixing, grinding, chopping, slicing, grating, shredding, or by a variety of other processing operations. A food processor typically includes a base housing an electric motor, a drive shaft driven by the motor, a bowl and a lid mounted to the bowl. A rotatably driven blade is mounted to the drive shaft to process the food product inside the bowl.

A limitation of existing food processor appliances is that they are confined to dedicated configurations of blade size and shape, bowl size and shape, and feed chute size and shape. Some are sold with interchangeable components, but, require storage space for these additional components, and, consequently, increase the overall expense of the appliance.

SUMMARY

Accordingly, an improved food processor is provided. The food processor components include one or more of a removable feed tube, a cover or lid for a feed tube opening, a double sided grating disc, a bowl or receptacle having a pour spout and a complimentary hinged spout lid on the bowl cover, a bowl mounted drive shaft, an extensible shaft for mounting various blades or discs at various heights, and an adjustable thickness slicing disc.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiment(s) given below, serve to explain the principles of the disclosure, wherein:

FIG. 2A is a perspective view of the main receptacle or housing of the food processor of FIG. 1;

FIG. 2B is a side view of the housing of FIG. 2A;

FIG. 2C is a side view of the drive shaft assembly of the housing of FIGS. 2A and 2B;

FIG. 3A is a perspective view of the housing of FIGS. 2A and 2B, including medium and small receptacles;

FIG. 3B is a side view of the housing of FIG. 3A;

FIG. 3C is a top view of the housing of FIGS. 3A and 3B;

DETAILED DESCRIPTION

Figure 1:
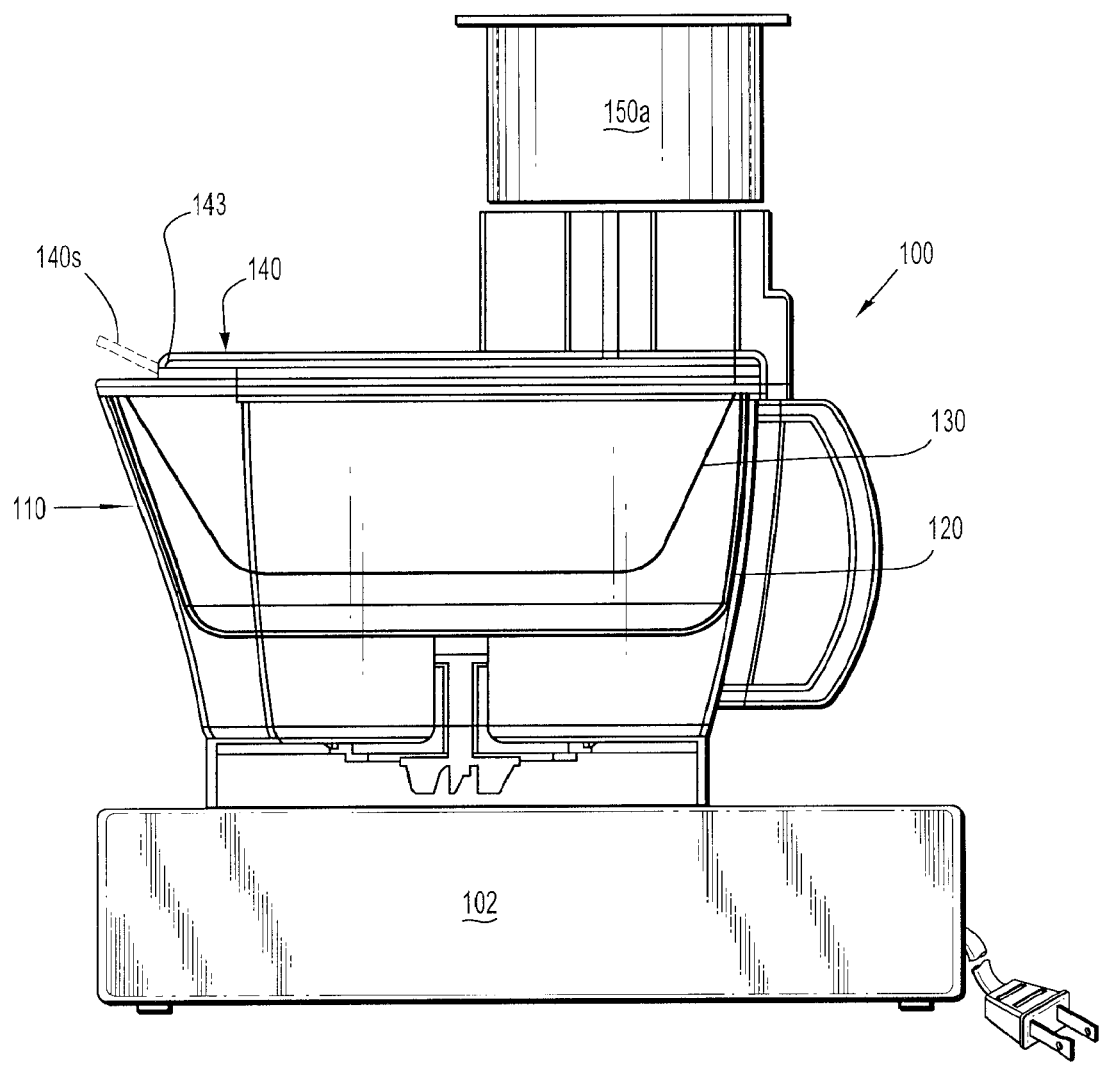
FIG. 1 is a side view of a food processor in accordance with an embodiment of the present disclosure.
Figure 4B:
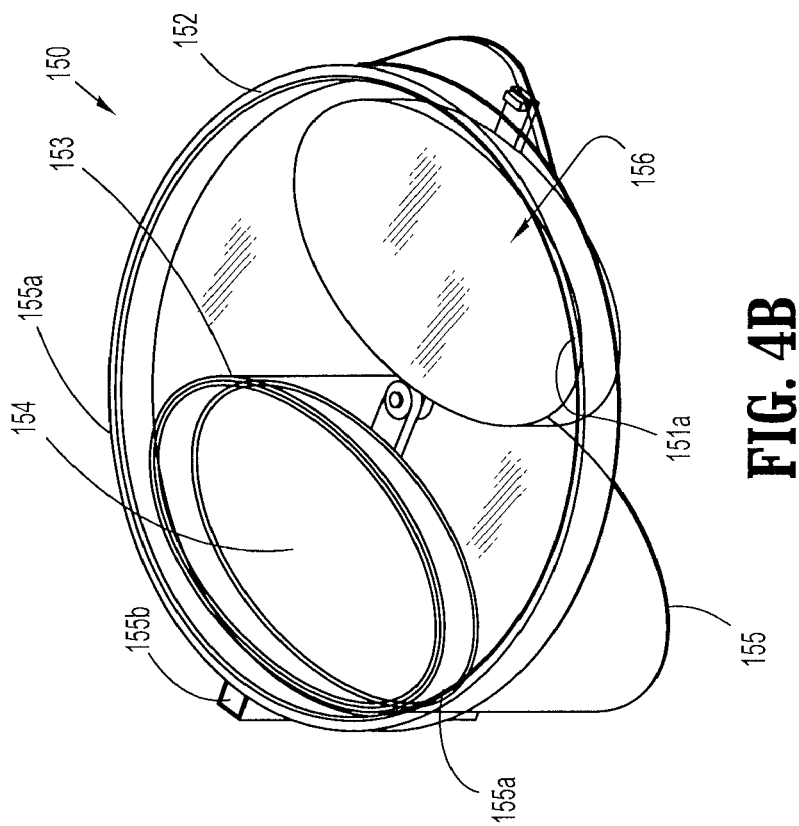
FIG. 4B is a perspective underside view of the lid of FIG. 4A.
Figure 4A:
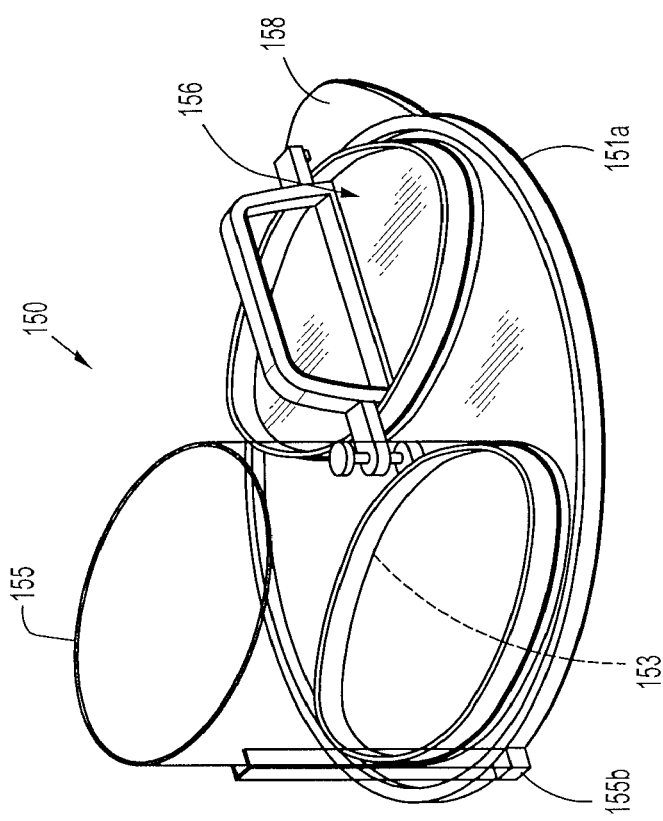
FIG. 4A is a perspective view of a lid of the food processor of FIG. 1.

Referring initially to FIG. 1, an improved food processor according to aspects of the present disclosure is shown generally as food processor 100. Food processor 100 includes base 102, a main receptacle or housing 110 operably connected to the base 102, and a lid 140 configured to be selectively removable from the main receptacle 110. Food processor 100 further includes nested medium receptacle 120 and small receptacle 130 selectively removable from within main receptacle 110.

Base 102 includes a motor or other rotary drive mechanism (not shown) and may include controls (not shown) for varying the settings of the motor. As will be discussed in further detail below, base 102 may include a locking mechanism (not shown) for preventing food processor 100 from activating when main receptacle 110 is not properly positioned on base 102 and/or lid 140 is not properly received on main receptacle 110. Base 102 may include additional features known in the art. Thus, the aspects of the present disclosure should not be read as limited by the configuration of the embodiment of base 102 as shown. One suitable base is disclosed in commonly assigned U.S. Pat. No. 7,063,283 to Wanat or commonly assigned U.S. Pat. No. 7,069,839 to Kernan, the entire contents of each disclosure being incorporated herein by reference.

Turning now to FIGS. 2A-2C, main receptacle 110 defines a large outer receptacle 112 having a handle 111 and a pour spout 113. Handle 111 includes a locking mechanism 111a configured to prevent food processor 100 from activating when main receptacle 110 and base 102, or main receptacle 110 and lid 140 are not properly aligned. Locking mechanism for food processors are known and locking mechanism 111a may include any of these various means for ensuring proper alignment of base 102, main receptacle 110 and/or lid 140. Main receptacle 110 includes lip or groove 110a for selective engagement with lid 140, as will be discussed in further detail below. Main receptacle 110 is operably connected to base 102. Mounted to a bottom 112a of receptacle 112 is a drive shaft assembly 115. Drive shaft assembly 115 includes a flange 116 operably secured to bottom 112a of receptacle 112. A tube 117 extends from flange 116 and includes a drive shaft 118. A first end of drive shaft 118 includes a drive coupling 118a configured to operably engage a drive mechanism of base 102 (FIG. 1). Drive coupling 118a is substantially similar to known blender-style couplings. A second end of drive shaft 118 includes a blade coupling 118b configured to engage a cutting blade or other attachment. As shown, blade coupling 118b defines a hexagonal member; however, alternative configurations are envisioned. Drive shaft assembly 115 further includes a bearing sleeve 119 positioned between drive shaft 118 and tube 117 to reduce the friction therebetween.

Referring now to FIG. 3A-3C, medium receptacle 120 is sized and dimensioned to be received within large receptacle 112. Medium receptacle 120 includes a pour spout 123. Medium receptacle 120 further includes a shaft extension mechanism 125. Shaft extension mechanism 125 extends through a bottom 120*a* of medium receptacle 120 and is operably connected to the second end of drive shaft 118. As will be discussed in further detail below, shaft extension mechanism 125 is configured to operably engage various attachments. Medium receptacle 120 may include handles (not shown) for facilitating removal of medium receptacle 120 from within large receptacle 112.

Still referring to FIGS. 3A-3C, small receptacle 130 is configured to be received within medium receptacle 120. Small receptacle 130 includes a flanged opening 132 for receiving shaft extension mechanism 125 from medium receptacle 120. As will be discussed in further detail below, small receptacle 130 is configured to permit selective mounting of various cutting and/or grating attachments.

Lid 140 may include spout cover 140*s* configured to cover spouts 113, 123 of large receptacle 112 and medium receptacle 120 (FIG. 1), respectively. Spout cover 140*s* is connected to lid 140 by hinge 143 (FIGS. 1 and 3B). Spout cover 140*s* is configured such that spouts 113, 123 of large and medium receptacles, 112, 120, respectively, are covered during activation of food processor 100. By pivoting away from spouts 113, 123, spout cover 140*s* permits the contents of large receptacle 112 or medium receptacle 120 to be poured without having to remove lid 140 from main receptacle 110.

Turning now to FIGS. 4A-5D, an alternate embodiment of lid 140 will be described. Lid 150 defines a substantially circular body 152 sized and dimensioned to cover main receptacle 110 (FIG. 1). Lid 150 includes internal frame 153 which defines a feed tube opening 154. Opening 154 may be generally oval-shaped although other shapes and dimensions are envisioned. Lid 150 may have feed tube 155 and a cover 156. Feed tube 155 is selectively positionable adjacent or within opening 154. Cover 156 is adapted for positioning relative to frame 153 to cover opening 154 in the absence of feed tube 155, e.g., when the feed tube 155 is not in operation. Lid 150 is configured for operable engagement with main receptacle 110. Lid 150 includes a groove or lip 151*a* extending about an outer circumference 151 configured for selective engagement with lip or groove 110*a* formed on main receptacle 110 (FIG. 1). Lid 150 further includes a flange 158 adapted for engagement by the operator to assist in removing the lid 150.

As shown, feed tube 155 defines a substantially annular body having a substantially oval cross-section. Feed tube 155 is configured for selective engagement with lid 150 about opening 154. Feed tube 155 may include tabs 155*a* configured to selectively engage lid 150. Tabs 155*a* may snap into corresponding structure of frame 153 to releasably secure feed tube 155 within opening 154. Feed tube 155 may be released from lid 150 by pressing tabs 155*a* inwardly toward each other. Feed tube 155 further includes a lock release mechanism 155*b* configured to operably engage lock mechanism 111*a* formed in handle 111 when feed tube 155 is properly secured to lid 150. Feed tube 155 is configured for use with a pusher 150*a* (FIG. 1) to encourage items through feed tube 155.

Turning to FIGS. 5A-5D, cover 156 is configured to selectively engage lid 150 about opening 154. Cover 156 defines a substantially oval body 160 and has handle 162. One end 162*a* of handle 162 is pivotally attached to frame 153 defining feed tube opening 154. In one embodiment, a pivot pin 166 extends through opening 168 of handle 162 and is received within a corresponding receiving element 170 of frame 153. Cover 156 may rotate or revolve about hinge or pin 166 to be displaced from feed tube opening 154 as depicted in FIGS. 5A-5D. It is envisioned the pin 166 may be threaded and receiving element 170 may incorporate internal threads whereby cover 156 may be selectively secured within any position relative to frame 153 including the "covered" position of FIG. 5A and the displaced position of FIG. 5D. Thus, cover 156 may not require complete removal from lid 150 during use of feed tube opening 154. The other end 162*b* of handle 162 may include detent 162*c* which may ride within a corresponding groove or beneath body 152 during the pivotal movement thereof.

In an alternative, cover 156 may be selectively engageable with 150 such that cover 156 may be separated from lid 150. In this manner, cover 156 may be inverted, with handle 162 facing downwards, and repositioned within opening 154 (shown in phantom in FIG. 5D), thereby reducing the profile of lid 150. Accordingly, cover 156 may be stored within lid 150 and within main receptacle 110.

Figure 5A:
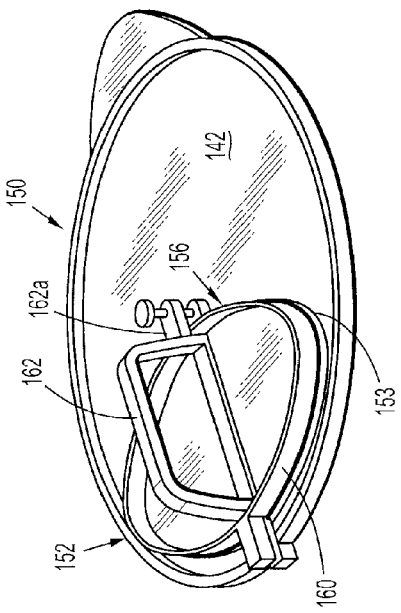
FIG. 5A-5D are perspective views of the lid of FIGS. 4A and 4B, with a cover for enclosing a feed tube opening in various stages of attachment.
Figure 5B:
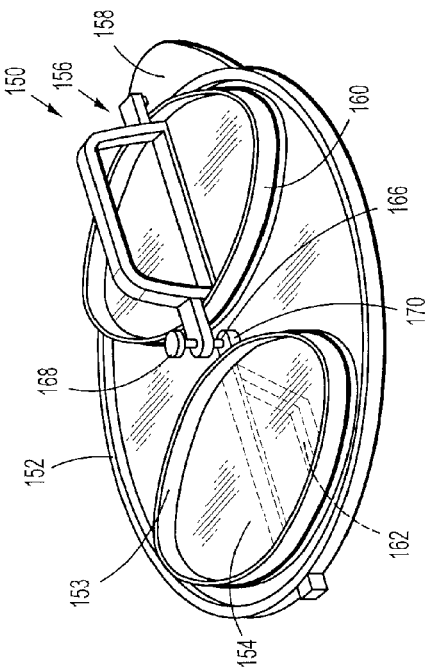
Figure 5C:
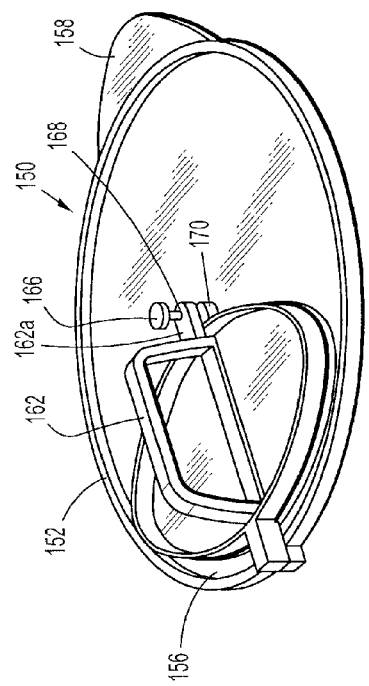
Figure 5D:
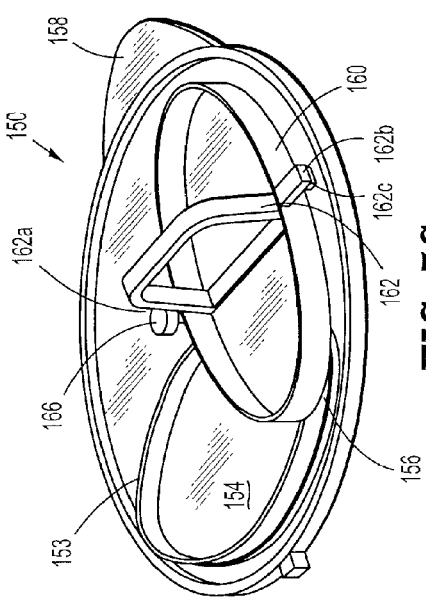
Figure 6B:
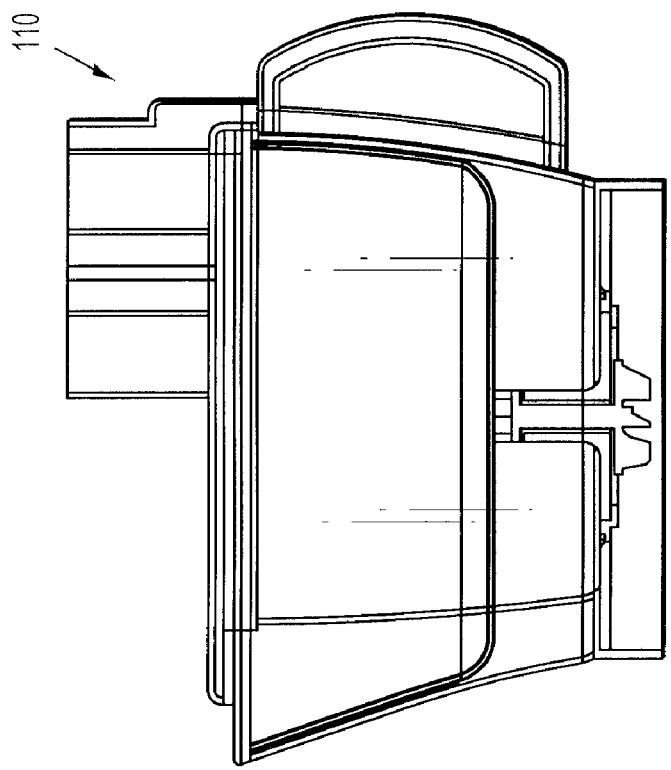
FIG. 6B is a side view of the housing of FIG. 6A.
Figure 6A:
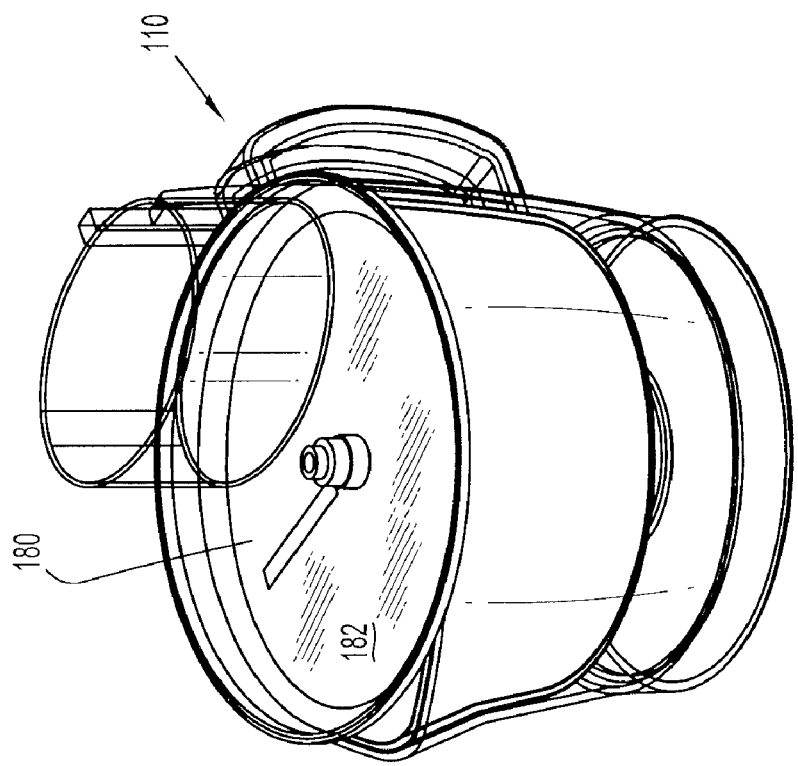
FIG. 6A is a perspective view of the housing of FIGS. 2A and 2B, including a slicing disc.
Figure 7C:
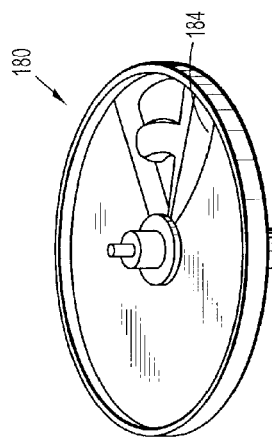
FIGS. 7A-7I are various views of the slicing disc of FIG. 6A.
Figure 7F:
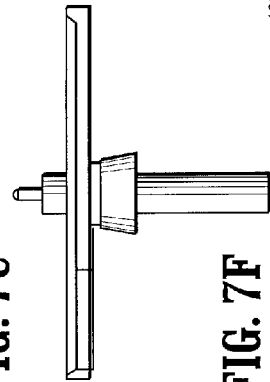
Figure 7I:
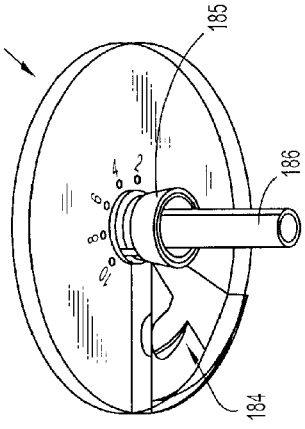
Figure 7B:
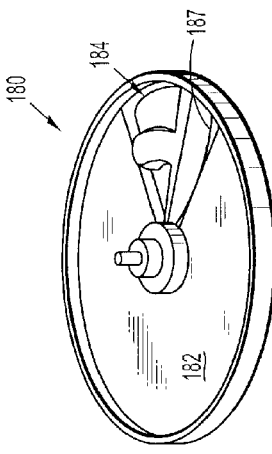
Figure 7E:
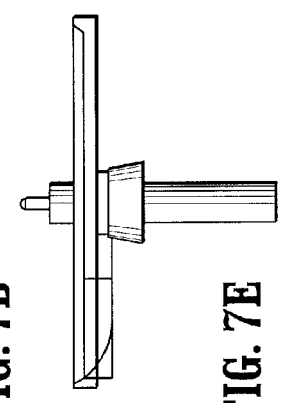
Figure 7H:
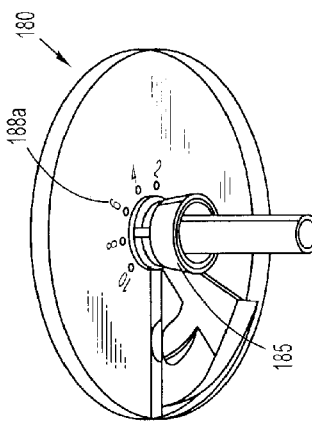
Figure 7A:
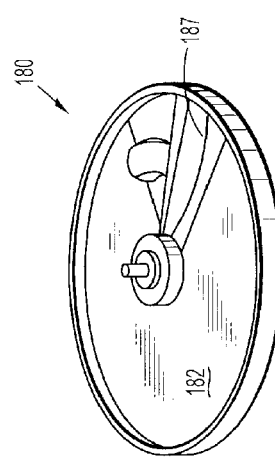
Figure 7D:
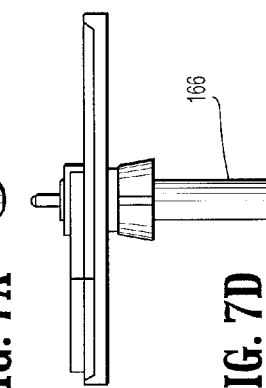
Figure 7G:
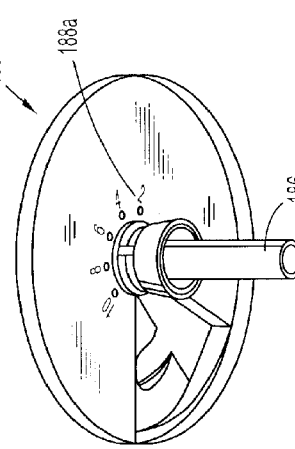

Handle 162 may includes a lock release mechanism 172 configured to operably engage safety lock mechanism 111*a* formed in handle 111 when cover 156 is properly secured to lid 150 about opening 154, in the first position (FIG. 5A).

Referring now to FIGS. 6A-7I, food processor 100 may include a slicing disc 180. Slicing disc 180 defines a substantially circular body 182 including an adjustable slicing mechanism 184. Extending from circular body 182 is a shaft 186 configured for operable engagement with drive shaft 118 (FIG. 1) through shaft extension mechanism 125. Adjustable slicing mechanism 184 includes an adjustment knob 185 configured to raise or lower slicing blade 187 relative to circular body 182. Slicing disc 180 may include indicia or markings 188*a* to indicate the distance of slicing blade 187 from circular body 182, thereby indicating slice thickness. Adjustable slicing mechanism 184 is configured such that slicing blade 187 may be positioned against circular body 182 to permit safe cleaning of slicing disc 190. Slicing disc 180 is configured to be received within small and/or medium receptacles 120, 130 (FIG. 1). Adjustable slicing mechanism 184 is positioned within slicing disc 180 such that slicing blade 187 aligns with opening 154 formed in lid 150 when lid 150 is securely attached to main receptacle 110. Any means for varying the height of slicing blade 187 with adjustment knob 185 are envisioned including threaded or cam means.

Figure 8B:
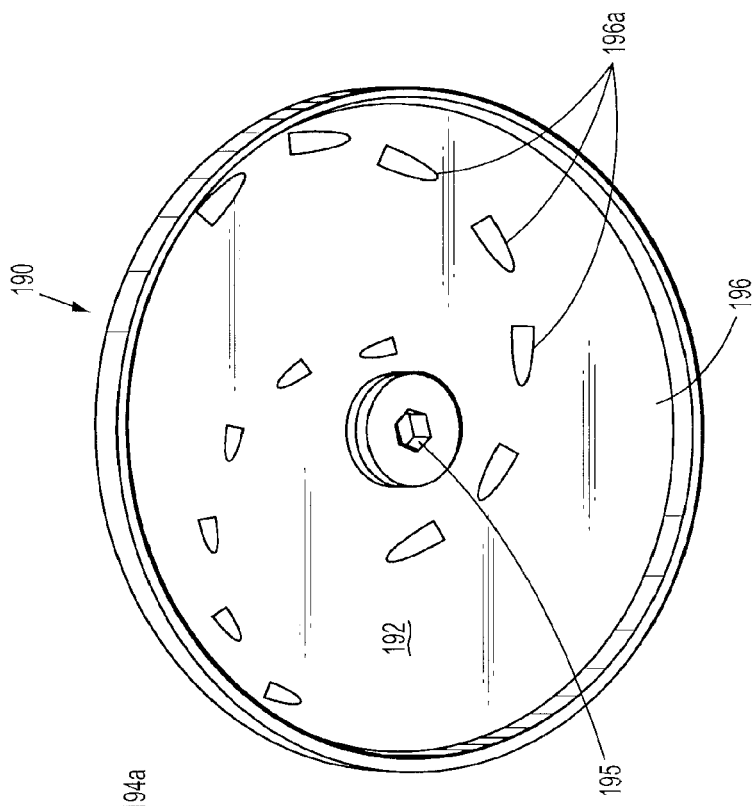
FIG. 8B is a bottom perspective view of the grating disc of FIG. 8A.
Figure 8A:
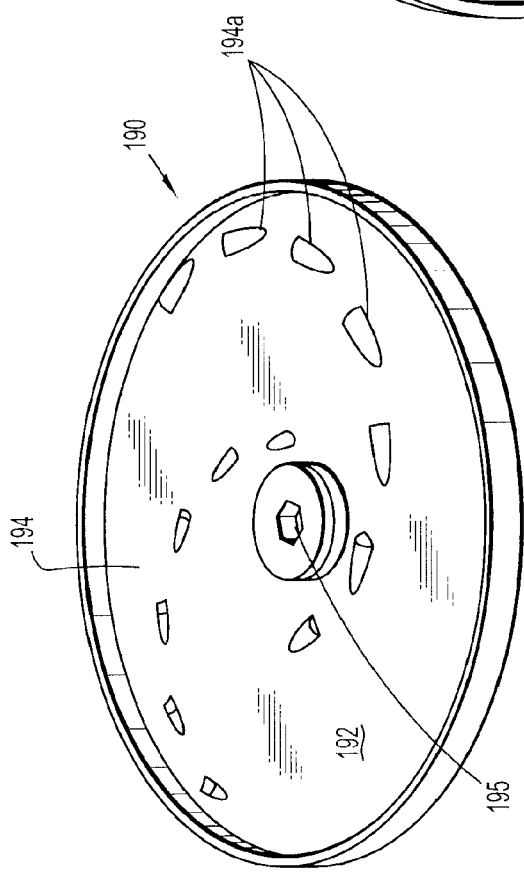
FIG. 8A is a top perspective view of a grating disc according to an aspect of the present disclosure for use with the food processor of FIG. 1.
Figure 8C:
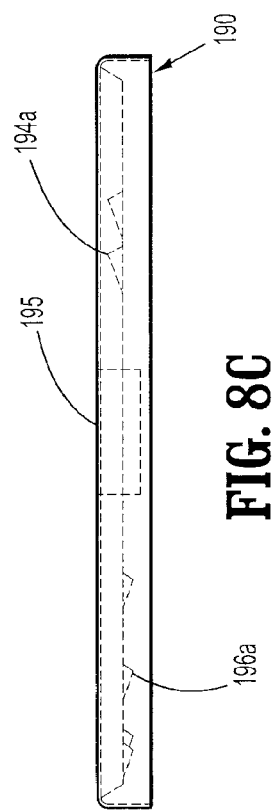
FIG. 8C is a side view of the grating disc of FIGS. 8A and 8B.
Figure 9A:
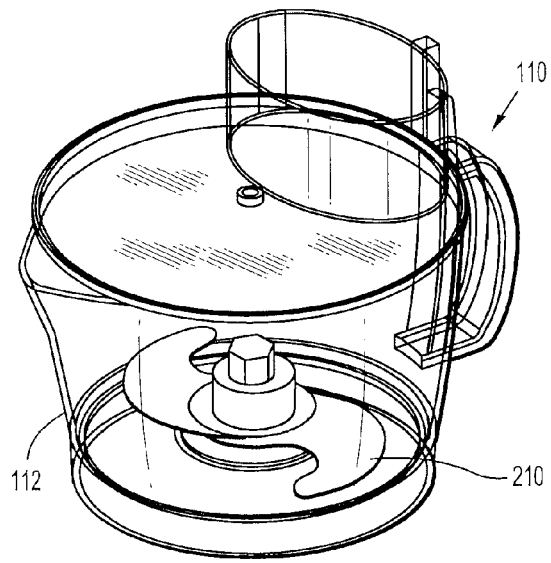
FIGS. 9A-9F are various views of the housing of FIGS. 2A and 2B, including a large chopping blade.
Figure 9C:
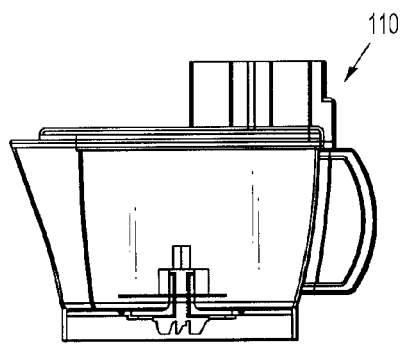
Figure 9D:
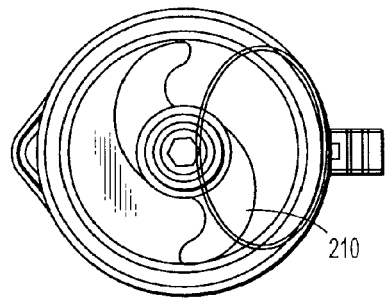
Figure 9B:
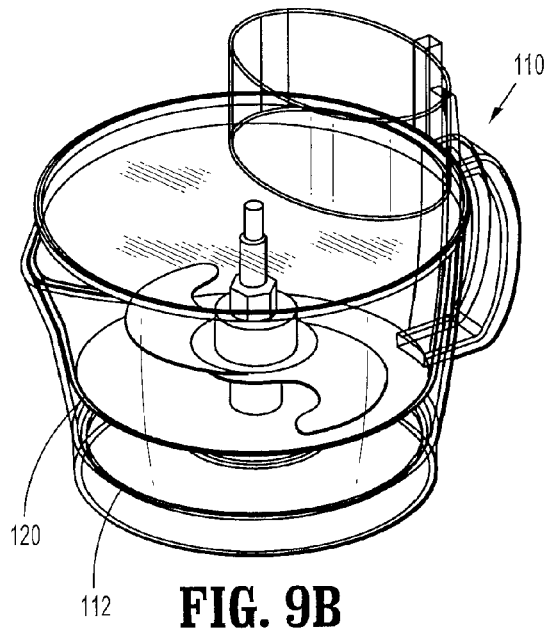
Figure 9E:
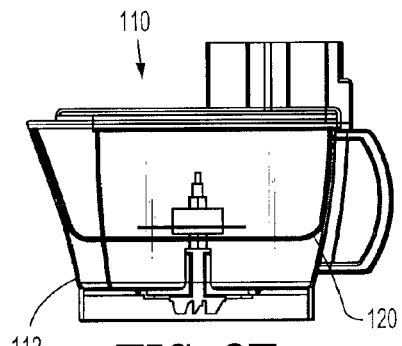
Figure 9F:
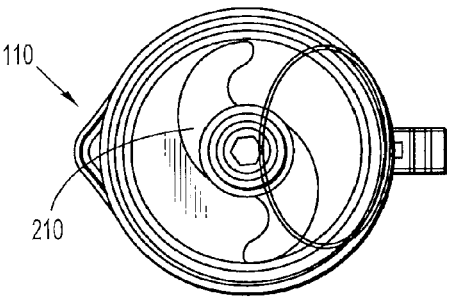

Turning to FIGS. 8A-8C, food processor 100 may include a grating disc 190. Grating disc 190 defines a substantially circular body 192 having a first side 194 and a second side 196 and defining an opening 195 therethrough. Opening 195 is configured for operable engagement with shaft 118 through shaft extension mechanism 125. First side 194 of grating disc 190 includes large cutters 194*a* for grating or creating julienne slices. Second side 196 of grating disc 190 includes small cutters 196*a* for finer grating. Grating disc 190 is configured to be received within small and/or medium receptacles 120, 130 (FIG. 1). As with adjustable slicing mechanism 184 of slicing disc 180, large and small cutters 194*a*, 196*a* of grating disc 190 are positioned such that cutters 194*a*, 196*a* align with opening 154 formed in lid 150 when lid 150 is securely attached to main receptacle 110.

Turning back to FIGS. 3A-3C, food processor 100 may further include a small chopping blade 200. Small chopping blade 200 is similar to known chopping blades and may include serrations, grooves, multiple cutting surfaces or other suitable configurations for food processing. Small chopping blade 200 is configured to be received with small receptacle 130. Small chopping blade 200 is configured fit about flanged opening 132 and operably engages shaft extension mechanism 125.

With reference now to FIGS. 9A-9F, food processor 100 may further include a large chopping blade 210. Like small chopping blade 200, large chopping blade 210 may include serrations, grooves, multiple cutting surfaces or other suitable configurations for food processing. Large chopping blade 210 is configured for operable engagement with drive shaft 118 and/or shaft extension mechanism 125, depending on which receptacle 112, 120, respectively, large chopping blade 210 is mounted. Large chopping blade 210 is configured for use within large receptacle 112 or medium receptacle 120.

Food processor 100 may be arranged in any number of configurations to perform various functions. Food processor 100 is configured for chopping, grating or slicing various items in various configurations.

Commonly assigned U.S. patent application entitled "Food Processor", filed Dec. 19, 2006, U.S. provisional Ser. No. 60/875,681 and commonly assigned U.S. patent application entitled "Food Processor", filed Dec. 19, 2006 U.S. provisional Ser. No. 60/875,679 each disclose subject matter related to the present disclosure. The entire disclosures of each of these applications are hereby incorporated by reference herein.

Although the illustrative embodiments of the present disclosure have been described herein with reference to the accompanying drawings, it is to be understood that the disclosure is not limited to those precise embodiments, and that various other changes and modifications may be effected therein by one skilled in the art without departing from the scope or spirit of the disclosure.

What is claimed is:

1. A food processor, which comprises:
   a base;
   an enclosure mountable to the base for containing food products and defining an enclosure axis;
   a drive mechanism mounted within the base; a drive shaft connected to the drive mechanism and rotatable about a drive axis upon actuation of the drive mechanism, and having a food processing blade mounted to the drive shaft and disposed within the enclosure;
   a lid for covering the enclosure, the lid defining a feed tube opening permitting access to within the enclosure;
   a feed tube removably mounted to the lid; and
   a feed tube opening cover removably mounted to the lid and adapted to selectively cover the feed tube opening.

2. The food processor according to claim 1 including a handle mounted to the feed tube opening cover, the handle dimensioned for engagement by an operator.

3. The food processor according to claim 2 wherein the handle is connected to the feed tube opening cover by a hinge, the handle being movable about the hinge to facilitate storage relative to the cover.

4. The food processor according to claim 1 including a reversible grating disc adapted for coupling to the drive shaft, the reversible grating disc having a first side with first cutting elements and a second side with second cutting elements different from the first cutting elements.

5. The food processor according to claim 1 wherein the enclosure includes a drive coupling assembly adapted for coupling with the drive shaft, the drive coupling assembly including an extended blade coupling for connection to the processing blade.

6. The food processor according to claim 1 including a second receptacle sized to be received within the main receptacle and including a shaft extension mechanism configured for operable engagement with the drive shaft assembly, the second receptacle including a pour spout.

7. The food processor according to claim 1 including a cutting disc adapted for coupling to the drive shaft, the cutting disc having a slicing blade mounted thereto, the slicing blade adapted for movement along the receptacle axis to vary a distance between the cutting blade and the cutting disc.

8. The food processor according to claim 7 including a rotatable control knob operatively connected to the cutting blade and rotatable to vary the distance between the cutting blade and the cutting disc.

9. The food processor according to claim 1 wherein the receptacle includes a spout cover adapted for pivotal movement between a closed position and an open position permitting pouring of food contents within the receptacle.

* * * * *